United States Patent [19]

Hirsch

[11] Patent Number: 5,099,430
[45] Date of Patent: Mar. 24, 1992

[54] METHOD AND APPARATUS FOR CONTINUOUSLY SUPPRESSING UNWANTED ROTATIONAL PHENOMENA IN A ROTATING BODY

[76] Inventor: Joseph Hirsch, 4746 59th St., San Diego, Calif. 92115

[21] Appl. No.: 264,136

[22] Filed: Oct. 28, 1988

[51] Int. Cl.⁵ .................. G01M 1/28; G01M 1/36; G01H 11/06
[52] U.S. Cl. .................... 364/463; 73/462; 73/469; 73/660
[58] Field of Search .......... 364/508; 73/462–469, 73/659, 660

[56] References Cited

U.S. PATENT DOCUMENTS

| | | | |
|---|---|---|---|
| 2,731,833 | 1/1956 | Jones | 73/458 |
| 3,769,754 | 11/1973 | Fryzel | 74/573 |
| 3,830,109 | 8/1974 | Litvinovich | 73/455 |
| 4,008,567 | 2/1977 | Hirsch | 60/39 |
| 4,064,704 | 12/1977 | Blackburn | 73/660 |
| 4,116,404 | 9/1978 | Howell | 244/3.23 |
| 4,184,205 | 1/1980 | Morrow | 364/508 |
| 4,399,513 | 8/1983 | Sullivan et al. | 364/508 X |
| 4,425,798 | 1/1984 | Nagai et al. | 73/659 |
| 4,442,712 | 4/1984 | Junck et al. | 73/462 |
| 4,458,554 | 7/1984 | Hrastar | 74/573 |
| 4,530,239 | 7/1985 | Scarinci | 73/455 |
| 4,535,411 | 8/1985 | Blackburn et al. | 364/508 |
| 4,626,147 | 12/1986 | Nystuen et al. | 364/508 X |

FOREIGN PATENT DOCUMENTS 619814  6/1978  U.S.S.R. .

OTHER PUBLICATIONS

A Practical Guide to In-Place Balancing, IRD Mechanalysis, Inc., Columbus, Ohio, Technical Paper No. 116, 1981.

Balancing Systems, IRD Mechanalysis, Inc., Columbus, Ohio, Brochure, 1983.

Precision In-Place Balancing, IRD Mechanalysis, Inc., Columbus, Ohio, Brochure, 1982.

Hirsch, Joseph, "Variable Dynamic Energy Absorber Control System", Navy Technical Disclosure Bulletin, vol. 11, No. 3, pp. 47 through 51, Mar. 1986.

Primary Examiner—Felix D. Gruber
Attorney, Agent, or Firm—Thomas J. Tighe

[57] ABSTRACT

For a body rotating on an axis and having a moment of inertia relative to the axis, an apparatus for dynamically suppressing unwanted rotational phenomena occurring relative to the axis of rotation, i.e., phenomena which exhibit themselves in a body only when the body is rotating about the axis, such as, dynamic imbalance and resonance at critical rotational speeds. One or more inertial masses are movably affixed to the body such that they can be selectively moved radially and circumferentially with respect to the axis. Appropriately placed sensors, such as strain gauges, accelerometers, vibration transducers, and the like detect the phenomena and pass pertinent parameters of the phenomena to a controller, preferably a computer, which analyzes the parameters to determine, among other things, the magnitudes of the phenomena. If a magnitude exceeds a selected threshold, the controller determines the optimum positions for one or more of the movable inertial masses to eliminate or effectively suppress the respective phenomenon.

8 Claims, 4 Drawing Sheets

METHOD AND APPARATUS FOR CONTINUOUSLY SUPPRESSING UNWANTED ROTATIONAL PHENOMENA IN A ROTATING BODY

BACKGROUND OF THE INVENTION

This invention relates to methods and apparatuses for automatically and dynamically eliminating unwanted rotational phenomena occurring in a rotating body having mass, such as, dynamic imbalance and resonance, and in particular to systems which correct the dynamic balance and/or avoid resonance of said bodies while they are rotating in-place. As used herein the terms "rotational phenomena" and "rotational phenomenon" refer to phenomena which exhibit themselves in a body only when said body is rotating, such as, dynamic imbalance and resonance at critical rotational speeds.

It is well known that imbalance is an unwanted rotational phenomenon occurring in a rotating body relative to its axis of rotation. It is one of the leading causes of deterioration and vibration of rotating machinery. Rotating machinery that is kept in continuous dynamic balance will operate smoothly, and thereby greatly diminish material fatigue. This invention presents a system that provides for dynamic adjustments to the balance of rotating bodies on an as needed basis, that is, the adjustments are made while the bodies are in motion whenever an imbalance is detected. The adjustments are made automatically in response to sensors in a closed or open loop control system. This invention is usable on a wide variety of rotating machinery and requires no operator intervention.

The necessity of maintaining dynamic balance in rotating machinery is well known. Modern high speed rotating machines require precision balancing, but heat and other environmental conditions make it difficult to maintain precision balance. These conditions are exacerbated by any small degree of unbalance, i.e. a small amount of unbalance induces greater wear in the bearings supporting the shaft and this greater wear induces more unbalance until failure of the entire rotating machine may take place. The problem can again be exacerbated by vibrations, resonating parts, and high centrifugal forces generated by the unbalanced mass which can cause the shaft to whirl. Until now no effective means of automatically and dynamically correcting for unbalance, other than for some specialized systems, has been proposed. One such specialized system is the freon balancer that is used in conjunction with grinding wheels, i.e. by converting the fluid to vapor and by transfer of fluid to vapor, balance is achieved. Most automatic dynamic balancing systems, like the freon balancer, are specially designed for a specific machine only and not generally adaptable to other types of rotating machinery.

Except for a very few specific devices, there is no general method for providing continuous dynamic balance. U.S. Pat. No. 4,458,554 fly wheels for space vehicle balance and U.S. Pat. No. 4,530,239 presents a ground operator "in hand" balancing.

In contrast to static unbalance which can be corrected by adding or subtracting force in a single radial plane, that is, a plane normal to the axis of rotation, dynamic unbalance presents many difficulties. A rotating body may be in static balance and not in dynamic balance, i.e. an unbalancing couple cannot be compensated for by adding or subtracting a force in a single plane. A compensating couple must be added or subtracted from the rotating body to make the geometric centerline coincide with the mass centerline of the rotating body, so two forces in two radial planes, at least, must be added to or subtracted from the rotating body to get dynamic balance. In some cases, such as dynamic balancing of large turbo-rotors, a three-plane balancing system may be required. In the process of achieving dynamic balance, any corrective force added or subtracted in one plane affects the other plane, so that the process of changing forces in each plane is an interactive one in which many attempts are made before dynamic balance is achieved.

New methods and programs for calculating weights to be added or subtracted in each plane have been developed in recent years. However, none of these procedures are truly automatic and require a manual intervention for their execution. For example, many procedures called "automatic dynamic balancing" are simply procedures for performing stationary in-place balancing which has the advantage of eliminating costly, time-consuming disassembly, and reinstallation of the rotor in the machine, but which nevertheless requires that the rotor be stopped and, further, requires manual intervention.

For example, there exists computer programs, such as the programs in a Model #245 Balancer made by IRD Mechanalysis, that automatically provide an operator with information as to an amount and location of correction weights to be added to at least two planes of a rotor to achieve dynamic balance. When an imbalance is detected, a human operator adds and removes a trial weight, and this is sufficient to enable the programs to compute the amount and location of the needed correction weights to be added to each plane for dynamic balancing. A computer read-out then communicates that information to the operator who then stops the rotation and adds the indicated weights at the indicated locations.

The automatic balancing apparatus presented herein is generally adaptable to many various types of rotating machinery. It provides for two-plane correction of rotor imbalance and can easily be adapted to provide three-plane or more corrections.

A further advantage of this invention is that it can also be used to avoid or reduce rotor vibrations due to another unwanted rotational phenomenon occurring relative to an axis of rotation, that is, resonance. It is well known that even perfectly balanced, rotating machinery suffers from vibrational problems due to resonance. Rotating machines have a shaft that is a rotating structural member and, as such, the shaft will have elastic deflection. No matter how finely dynamically balanced, some amount of imbalance will exist, because the center of mass and the geometric center do not exactly coincide. As a result of this dynamic imbalance, there will exist a centrifugal force which will cause the shaft to deflect. At critical rotational speeds the rate of deflection matches or closely matches a natural frequency of the body or a significant harmonic thereof, and resonance can occur which causes the deflections to become amplified and can result in dynamic instability. Resonance can occur whenever a forcing frequency, i.e., the frequency of a periodic force acting upon a body causing it to rotate, equals or very nearly equals a natural frequency of said body or a harmonic thereof. When resonance occurs, the body is set into vibration with a relatively large and often destructive amplitude.

Heretofore, resonance in rotating machinery has been avoided in most cases by controlling the frequency of the driving force, i.e., by increasing or decreasing said driving force frequency to make it different from a natural frequency and its harmonics. This has the direct effect of increasing or decreasing, respectively, the angular velocity of the rotating body. However there are many situations where it is not always practical to change the angular velocity of a rotating body to avoid resonance. For example, in some helicopters, under certain conditions of wind gusts or maneuvers, flutter or other main rotor vibrations can occur, or resonant frequencies can be excited from the interaction of the forcing frequencies caused by the main and tail rotor oscillations. The shedding of vortices off the tips of the helicopter blades may also exacerbate the vibrational problems. In helicopters with gas turbine engines, it is desirable to maintain constant engine rotational speed under substantially all conditions. This invention provides the means and method for avoiding resonance without changing engine rotational speed. Rather than simply avoiding disturbing frequencies which are too close to the natural frequency of the rotating body and its harmonics, this invention provides a way to selectively change said natural frequency. Also, this invention provides the means to establish a variable dynamic energy absorber in a rotating system operating over a range of disturbing frequencies.

Other advantages and attributes of this invention will be readily discernible from the specification and claims hereinafter.

SUMMARY OF THE INVENTION

It is an object of this invention to provide an effective means for dynamically eliminating or suppressing unwanted rotational phenomena occurring in a rotating body relative to its axis of rotation, i.e., while said body is rotating in-place.

It is a further object of this invention to provide an effective means for dynamically balancing a rotating body along its axis of rotation, i.e., while said body is rotating.

It is a further object of this invention to provide a means as described in the preceding paragraph which requires no manual intervention.

It is a further object of this invention to provide a means as described in each of the preceding two paragraphs which does not require that the rotating body be stopped to achieve corrections in dynamic balance.

It is a further object of this invention to provide a means as described in each of the three preceding paragraphs which automatically and continuously maintains dynamic balance in a rotating body.

It is a further object of this invention to provide a single means for continuously maintaining dynamic balance in a rotating body, which means does not require that the body be stopped in order to achieve corrections in dynamic balance, and for making selective adjustments to components of a moment of inertia of said body to change the natural frequency of the rotating body to avoid or suppress resonance.

It is a further object of this invention to provide a method and means for variable dynamic energy absorption in a rotating system.

Other objects of this invention will be seen from a reading of the text and claims hereinafter.

These objects and others are accomplished by an apparatus comprising: (a) means for varying the magnitude and phase of the moment of inertia of said rotating body relative to said axis of rotation in at least one pair of radial planes on opposite sides of the center of mass of the rotating body, (b) means for sensing such an unwanted rotational phenomenon which is substantially eliminable by suitable variation of the moment of inertia of the rotating body in one or more of said radial planes, and for communicating pertinent parameters of said sensed rotational phenomenon, (c) means for receiving said parameters from said sensing means, determining therefrom said suitable variation of the moment of inertia of the rotating body in said radial planes, and causing said means for varying the moment of inertia to affect said suitable variation.

DESCRIPTION OF THE PREFERRED EMBODIMENT

Figure 1:
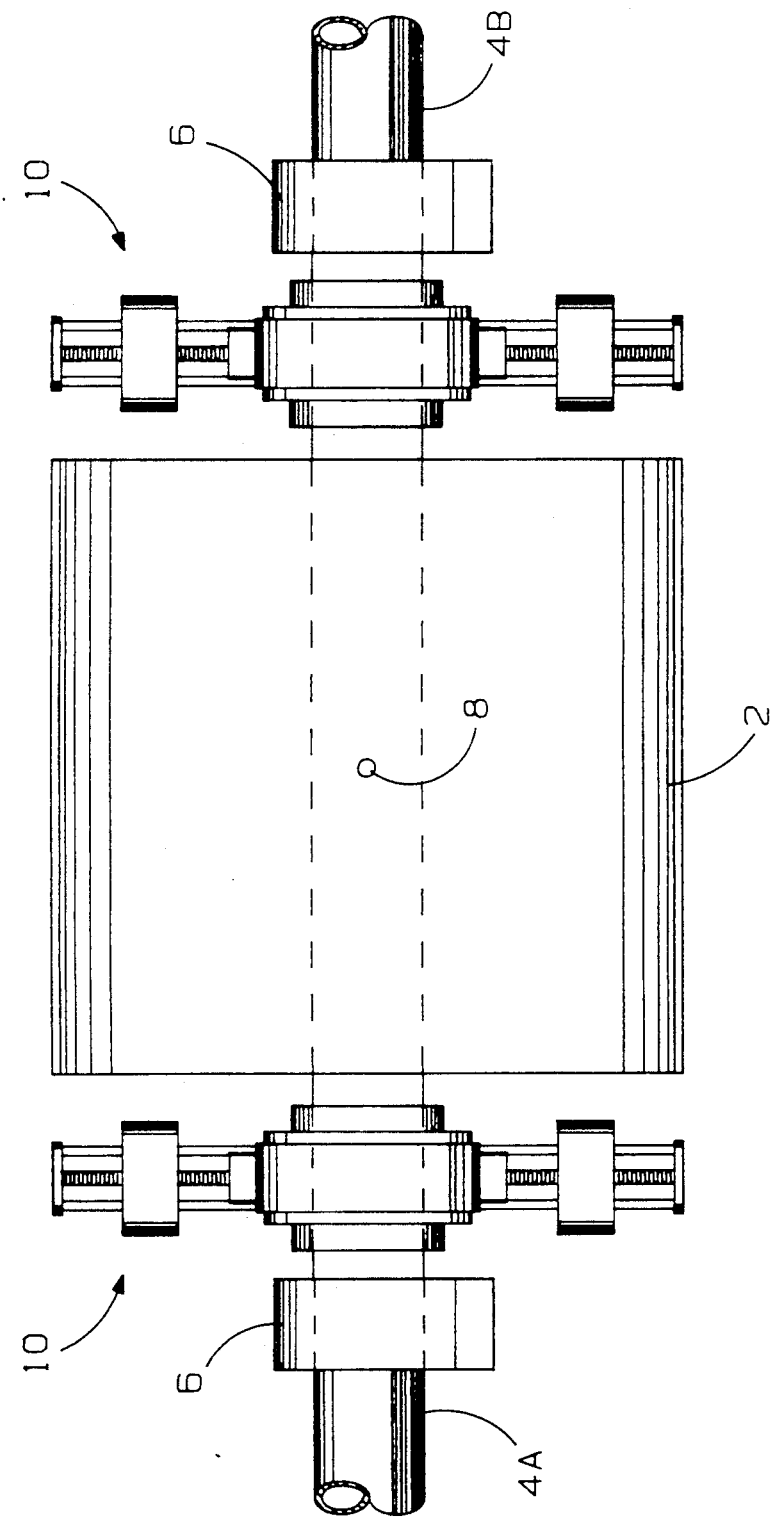
FIG. 1 is a plan view illustrating a rotating body with this invention mounted thereon.

Referring to FIG. 1, a rotating body is illustrated as a cylindrical rotor 2 having axial shafts 4A and 4B extending therefrom at opposite ends. The axial (the longitudinal axes of the shafts coincide with the geometric axis of the body) shafts extend through a pair of bearings 6. The rotating body has a center of mass designated 8 which is not necessarily the geometric center. A pair of sensors (not shown) are mounted on opposite sides of the rotor. The sensors may be accelerometers, induction gages or strain gages or other sensory devices, as appropriate for sensing rotational characteristics of the rotating body which signify the presence of one or more rotational phenomena, which if said characteristics exceed preselected threshold values signify that the phenomena are unwanted. The sensors can be attached to the bearings or machine frame holding the shafts. Two balancing devices 10 are affixed to the rotating body in separate radial planes, that is, separate planes radiating normal from an axis of rotation of said body, and on opposite sides of its center of mass 8. As will be explained, weight corrections will be made using the balancing devices. Alternately, the devices may be an integral part of the rotating body.

Figures 2, 3:
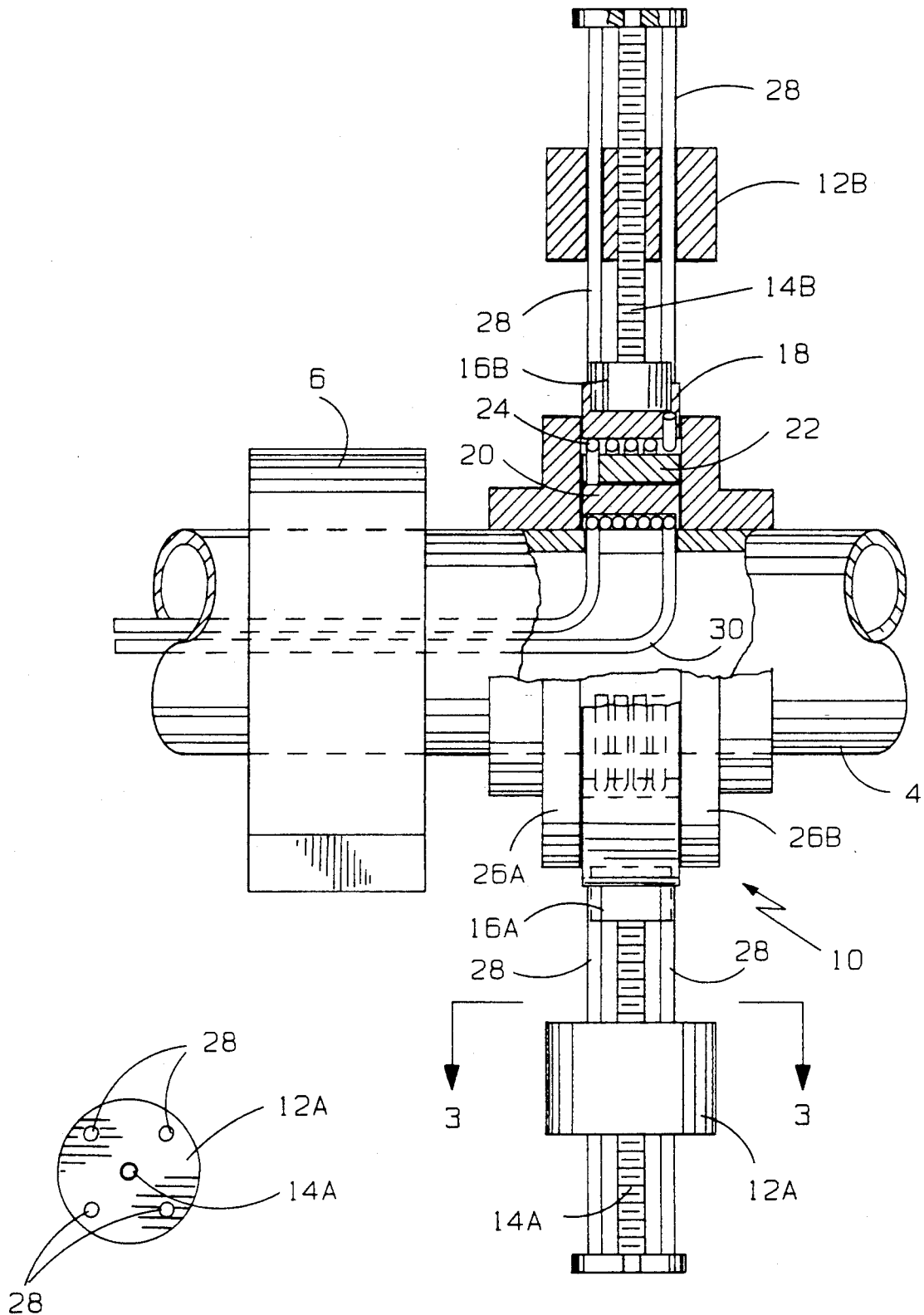
FIG. 2 is a section view illustrating a balancing device.
FIG. 3 is section view taken along line 3—3.

Referring to FIG. 2, a balancing device 10 is shown to be mounted on a shaft 4. Each balancing device 10 contains a pair of inertial masses, 12A and 12B, of known and preferably equal mass movable by screws, 14A and 14B respectively, upon which said inertial masses are threaded, radially toward and away from the axis of the shaft 4 which is the axis of rotation of the body. The screws, 14A and 14B, are driven by bi-directional stepper motors, 16A and 16B respectively, and are oppositely directed so that the inertial masses moved along lines which are 180 degrees apart. The stepper motors are each affixed to an outer ring 18 which is concentric with the shaft. The inertial masses, 12A and 12B, can move independent of each other.

Referring again to FIG. 2, between the shaft 4 and the outer ring 18 is an annular electromagnet 20 which is affixed to the shaft co-planarly with the outer ring. Concentric with and adjacent to the outside of the electromagnet is an inner ring 22, and disposed between the inner and outer rings is a torsion spring 24. The torsion spring 24 as illustrated is a wire spring annularly wound around the inner ring and affixed thereto at one end, and affixed at the other end to the outer ring. Confining brackets, 26A and 26B, affixed to the shaft hold the rings and the torsion spring in place.

Referring to FIGS. 2 and 3, projecting outwardly from the outer ring are two sets of guide rods 28, the rods of each set being parallel to, radially spaced from, and angularly spaced around one of the screws, 14A and 14B. The rods are co-extensive with their respective screws and act to guide and cantileverly support the inertial masses, 12A and 12B, by extending through holes defined by the inertial masses.

Referring again to FIG. 2, the electromagnet 20 and the stepper motors are energized via electrical wiring, 30 and 32 respectively, and slip rings (not shown). The inner ring 22 is made of any suitable magnetic material that will be magnetically attracted by the magnetic force exhibited by the electromagnetic ring 20 when it is energized. When the electromagnet is de-energized, the inner ring 22 is freely slidable over the electromagnet, and the outer ring 18 and inertial masses are not rigidly coupled to the shaft. When the electromagnet is energized, the resultant magnetic force couples the inner ring to the electromagnetic ring and the inner ring and consequently the inertial masses then turn with the shaft. This ability to selectively couple and de-couple the inertial masses to the shaft is used to selectively position the inertial masses around the periphery of the shaft which, in effect, sets the phase of the compensating couple being created by movement of the inertial masses. The torsion spring 24 acts as an inertial buffer between the inner and outer rings when coupling and de-coupling takes place.

Referring again to FIG. 2, the torsion spring 24 also serves as an element for reducing the torsional spring constant of the rotating body and thereby enhances the use of the dynamic energy absorption aspect of this invention.

Figure 4:
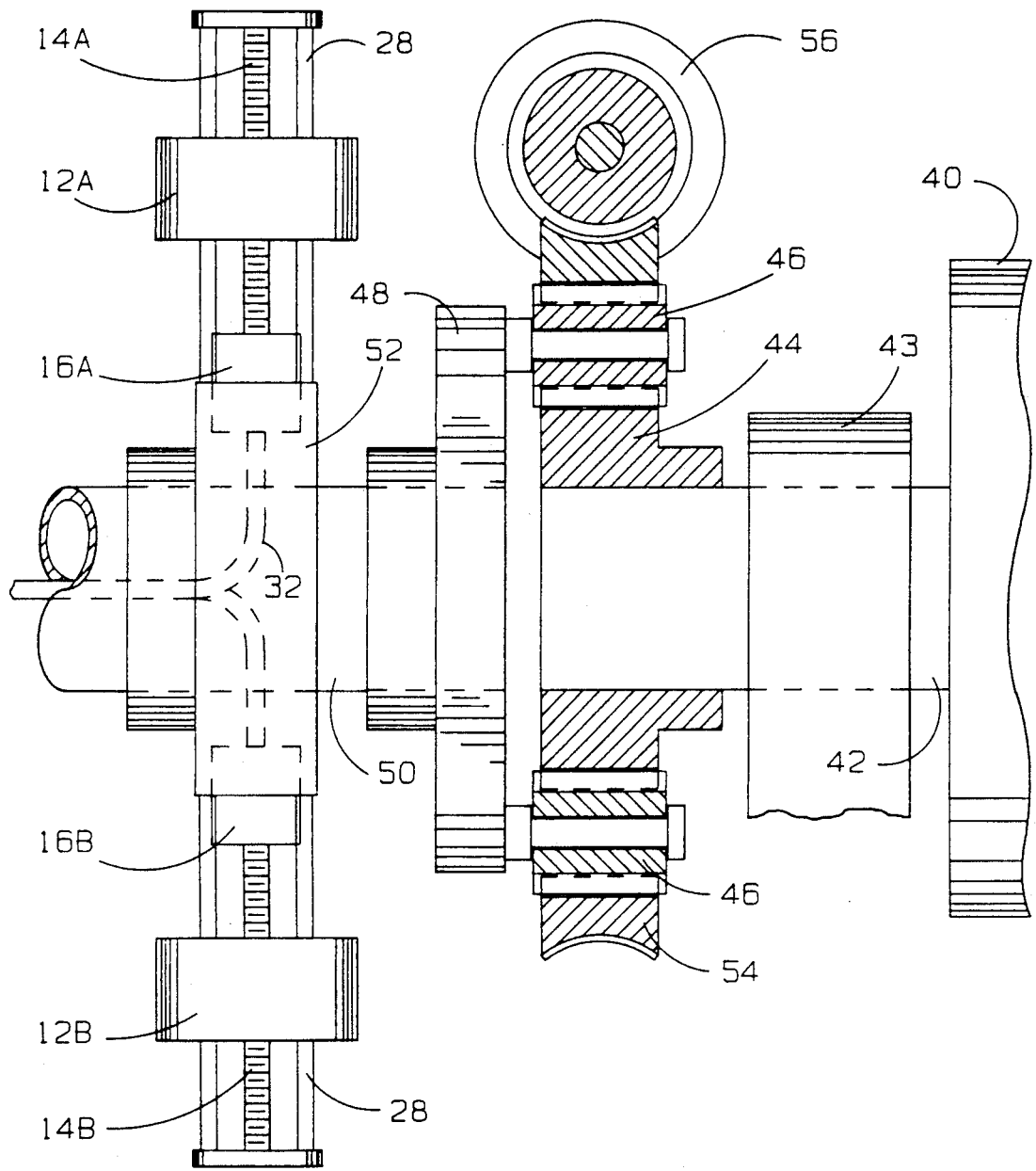
FIG. 4 is a section view of an alternate way of mounting this invention on a rotating body.

Referring to FIG. 4, a means for radially positioning the masses is illustrated. A rotating body 40 with end shaft 42 has a spline gear 44 affixed at the remote end of said shaft. Engaged with the spline are a plurality of spider gears 46. The spider gears are affixed to a yoke 48 which turns a yoke shaft 50. Affixed to the shaft 50 is a balancing device comprising an annular bracket 52 affixed to the shaft 50. The spider gears are engaged with and turn inside a differential ring gear 54. The outside of the ring gear 54 is a worm gear selectively driven by a phasing motor 56. Mounted on the annular bracket 180 degrees apart are a pair of stepper motors which drive a pair of screws which, in turn, radially position a pair of inertial masses, the bodies being guided and supported by two sets of guide rods, all as previously described in reference to FIG. 2. The phase of the compensating couple is, in this case, set by selective energization of the phasing motor.

In operation, control of the stepper motors is cybernetic, i.e. output of the sensors, such as strain gauges mounted on the bearings holding the shaft, determine the positioning of the inertial masses. If the forces on the bearings are within specified tolerances, than the shaft is within the required dynamic balance. If the forces on the bearings are greater than the specified tolerances, than the strain gauges measuring the forces will send signals to a controller which will interpret the signals and make a determination as to the direction and extent one or more of the inertial masses should be moved radially and/or angularly. After the determination has been made, the controller will selectively energize one or more of the stepper motors and/or the means for moving one or more of the inertial masses angularly. The motors turn the screws which move the inertial masses to positions that balance the rotating body. When the shaft is balanced within tolerances, then there is only the specified force on the bearings and there will be no signal output, i.e. no signal to move the inertial masses. One could compare this type of cybernetic control (strain gauge control) to the control achieved by Watt's centrifugal balls used on the steam engine. Watt's centrifugal balls are inherently stable as is the dynamic balancing system of this invention using strain gauges.

Figure 6:
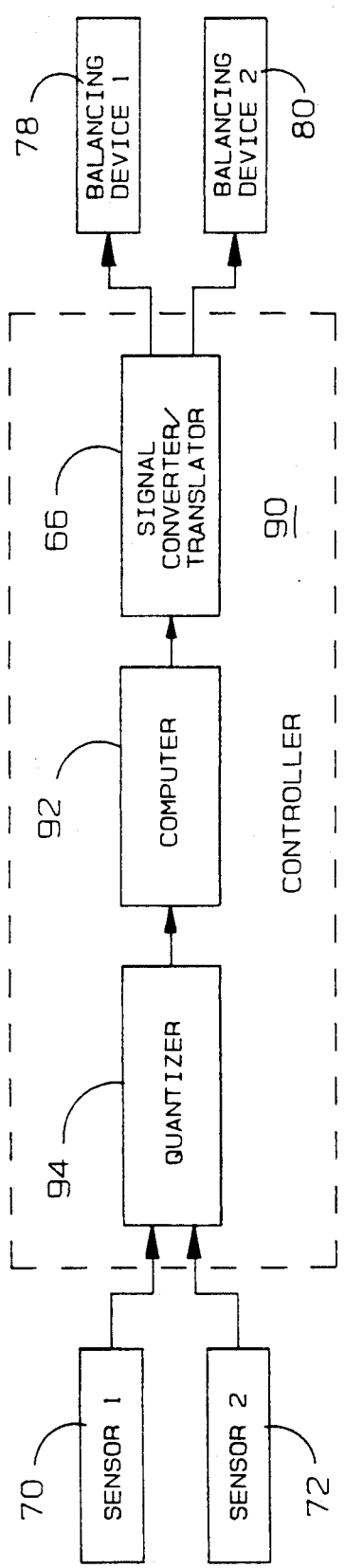
FIG. 6 is a block diagram of a control system for maintaining dynamic balance.

Referring to FIG. 6, a system for maintaining dynamic balance with a computer 92 as the basic element of a controller 90 is illustrated. Two sensors, 70 and 72, measuring the parameters of dynamic forces being exerted relative to the axis of rotation send signals corresponding to said forces to the controller to see if the values of the parameters are great enough to initiate action. If great enough, the controller does a preliminary corrective analysis and sends appropriate correction signals to balancing devices, 78 and 80, respectively.

Figure 5:
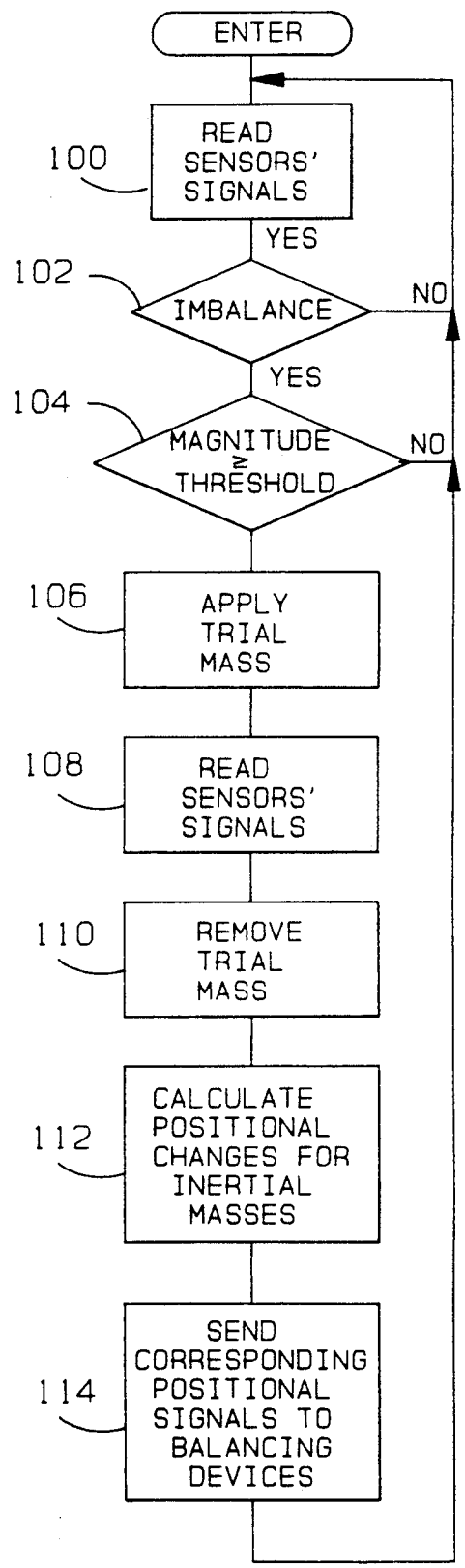
FIG. 5 is a flow diagram of an automatic balancing process according to this invention.

The program in the controller's computer 92 of FIG. 6 can be the IRD Mechanalysis programs or their equivalent adapted for automatic operation. In operationas illustrated in FIG. 5, the dynamic force measurements being made by suitably placed sensors, such as strain gauges on the rotor support bearings, are monitored by the controller for any dynamic imbalance greater than a selected threshold. When an imbalance is detected and its magnitude is beyond the selected threshold, the controller automatically initiates corrective action without stopping the rotor. The output of the force measurements by the sensors are typically in the form of corresponding analog signals which are quantized by a quantizer 94 and communicated to the computer 92. The computer's program continuously analyzes the quantized signals to determine whether an imbalance exists, steps 100 and 102, and if so, whether the magnitude of the imbalance is above a selected threshold, step 104. If both conditions are true, then the program causes a test body (of known mass to move radially outward a known distance step 106, in order to acquire additional information to enable the program to make the necessary calculations. The program then notes the changes in the signals from the sensors, step 108, and returns the test body to its original position, step 110. For at least two inertial masses of known mass which are movably affixed to the rotor in different radial (with respect to the axis of rotation) planes on opposite sides of the center of mass of the rotor for correcting the imbalance, said inertial masses each being radially movable over a range and angularly (with respect to the axis of rotation) movable over substantially 360 degrees (see the balancing devices 10 illustrated in FIGS. 1-4), the program is able to calculate from the noted changes the radial and angular positions, respectively, of the inertial masses to offset the imbalance. After calculating said positions, the program causes the inertial masses to move to said respective positions, step 114.

The foregoing description and drawings were given for illustrative purposes only, it being understood that the invention is not limited to the embodiments disclosed, but is intended to embrace any and all alternatives, equivalents, modifications and re-arrangements of elements falling within the scope of the invention as defined by the following claims.

I claim:

1. For a body rotating on an axis and having a moment of inertia relative to said axis, a system for dynamically suppressing dynamic imbalance of said body relative to said axis of rotation, comprising:
   (a) means for selectively varying the magnitude and phase of the moment of inertia of said rotating body relative to said axis of rotation in at least one pair of radial planes on opposite sides of the center of mass of the rotating body while said body is in-place and rotating, said means for varying the moment of inertia being responsive to control signals,
   (b) means for sensing a condition of imbalance with respect to said axis of rotation, and for communicating pertinent parameters of said sensed imbalance to a control means,
   (c) the control means comprising:
      (1) means responsive to parameters communicated by the sensing means for selecting trial and imbalance correction variations in the magnitude and phase of the moment of inertia of the rotating body, and
      (2) means for producing said control signals corresponding to said selected variations in the magnitude and phase of the moment of inertia of said rotating body.

2. The system according to claim 1 wherein the means for varying the magnitude and phase of the moment of inertia in said pair of radial planes comprises:
   (a) two known masses movably affixed to the rotating body, one in each of said radial planes, and
   (b) means for selectively and individually moving said known masses radially and angularly, both with respect to the axis of rotation, within their respective planes.

3. The system according to claim 1 wherein said means responsive to parameters communicated by the sensing means for selecting trail and imbalance correction variations is a computer executing the set of programs comprising the software in the IRD Model #245 Balancer or their equivalent adapted for automatic operation.

4. The system according to claim 1 wherein the means for varying the magnitude and phase of the moment of inertia in said pair of radial planes comprises:
   (a) at least two pairs of known masses, the pairs being disposed on opposite sides of the center of mass of the rotating body in respective planes normal to the axis of rotation of the body,
   (b) for each known mass of each pair, means for driving said mass bi-directionally along a radial line of movement, with respect to the axis of rotation, in said mass' respective plane, and holding said mass at selected positions on said line of movement, the lines of movement of the known masses of each pair being spaced angularly apart, and
   (c) for each pair, means for selectively coupling and decoupling rigidly both driving means of said pair from the rotating body in order to selectively set the phase of the couple of the pairs.

5. The system according to claim 4 wherein the means for driving each known mass bi-directionally along a radial line of movement and holding said mass at selected positions on said line of movement comprises a screw shaft upon which the mass is threaded being steppingly turned by a stepper motor, and means for selectively energizing the stepper motors.

6. The system according to claim 4 wherein the means for selectively coupling and decoupling rigidly both driving means of each pair of known masses from the rotating body comprises:
   (a) an annular electromagnetic means affixed to an axial shaft protruding from the rotating body,
   (b) a ring slippingly mounted concentrically upon the annular electromagnetic means, the driving means being mounted upon the annular ring, the annular ring being held in rigid relation to the electromagnetic means when the electromagnetic means is energized, and
   (c) means for selectively energizing said electromagnetic means.

7. For a rotating body having at least two known massed movably affixed to the rotating body on opposite sides of the center of mass of the rotating body, the masses being selectively and individually movable radially over a range and angularly over substantially 360 degrees, both with respect to the axis of rotation of the body, a method of achieving in-place dynamic balance of the body with respect to the axis of rotation of said body while it is rotating, comprising the steps:
   (a) positioning at least two force measuring devices in positions on opposite sides of the center of mass of said body where they can each measure, at their respective positions, the dynamic forces exerted by the body with reference to the axis of rotation,
   (b) comparing the respective force measurements of said devices to determine if a dynamic imbalance exists,
   (c) if an imbalance exists, comparing the magnitude of the imbalance with a pre-selected threshold value,
   (d) if an imbalance exists and its magnitude exceeds the threshold value, determining a trial variation of the magnitude and phase of the moment of inertia of the body,
   (e) moving at least one of the known masses in its respective radial plane of movement to affect the trail variation,
   (f) noting all changes and/or absence of changes in the dynamic forces being measured,
   (g) returning the mass moved for the trial variation to its original position,
   (h) calculating from the noted changes and/or absence of changes the respective radial and angular positions at which the known masses would offset the imbalance, and
   (i) moving the known masses to their respective calculated positions.

8. For a rotating body having at least two known masses movably affixed to the rotating body on opposite sides of the center of mass of the rotating body, the masses being selectively and individually movable radially over a range and angularly over substantially 360 degrees, both with respect to the axis of rotation of the body, a method of maintaining in-place dynamic balance of the body with respect to the axis of rotation of said body while it is rotating, comprising the steps:

(a) positioning at least two force measuring devices in different positions on opposite sides of the center of mass of said body where they can each measure, at their respective positions, the dynamic forces exerted by the body with reference to the axis of rotation, (b) continuously comparing the respective force measurements of said devices to determine if a dynamic imbalance exists, (c) if an imbalance exists, comparing the magnitude of the imbalance with a pre-selected threshold value, (d) if an imbalance exists and its magnitude exceeds the threshold value, determining a trial variation of the magnitude and phase of the moment of inertia of the body, (e) if an imbalance exists and its magnitude does not exceed the threshold value, then repeating step (b), (f) moving at least one of the known masses in its respective radial plane of movement to affect the trial variation, (g) noting all changes and/or absence of changes in the dynamic forces being measured, (h) returning the mass moved for the trial variation to its original position, (i) calculating from the noted changes and/or absence of changes the respective radial and angular positions at which the known masses would offset the imbalance, (j) moving the known masses to their respective calculated positions, and (k) repeating step (b).

* * * * *